United States Patent
Esteban Varés et al.

(10) Patent No.: US 8,516,066 B2
(45) Date of Patent: Aug. 20, 2013

(54) METHOD AND APPARATUS FOR HANDLING SUBSCRIPTIONS TO CHANGES IN USER DATA IN A TELECOMMUNICATIONS SYSTEM

(75) Inventors: Nuria Esteban Varés, Aranjuez (ES); Emiliano Merino Vazquez, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/386,064

(22) PCT Filed: Jul. 2, 2010

(86) PCT No.: PCT/EP2010/059458
§ 371 (c)(1),
(2), (4) Date: Jan. 20, 2012

(87) PCT Pub. No.: WO2011/023435
PCT Pub. Date: Mar. 3, 2011

(65) Prior Publication Data
US 2012/0124156 A1 May 17, 2012

Related U.S. Application Data (60) Provisional application No. 61/236,698, filed on Aug. 25, 2009.

(51) Int. Cl.
*G06F 15/16* (2006.01)
(52) U.S. Cl.
USPC .................... 709/206; 709/204; 709/205
(58) Field of Classification Search
None
See application file for complete search history.

(56) References Cited

U.S. PATENT DOCUMENTS 6,507,645 B1 * 1/2003 Leitgeb et al. ........... 379/201.12

(Continued)

FOREIGN PATENT DOCUMENTS

JP 2005521950 A 7/2005

(Continued)

OTHER PUBLICATIONS

Moran, T et al. "Architecture for Event Notification Filters." Internet Engineering Task Force (IETF), Standard Working Draft, Oct. 1, 2002, published online at <http://tools.ietf.org/html/draft-moran-sipping-filter-arch-01>.
3rd Generation Partnership Project. "IP Multimedia (IM) Subsystem Sh Interface; Signalling Flows and Message Contents (Release 7)."

(Continued)

*Primary Examiner* — Umar Cheema
(74) *Attorney, Agent, or Firm* — Coats & Bennett, P.L.L.C.

(57) ABSTRACT

There is provided a method for handling subscriptions from a subscriber node (700) to changes in data relating to a user held at a database node (900) in a telecommunications system. At the subscriber node (700) a subscribe message is prepared (S1) comprising: first information identifying first data which the subscriber node (700) wishes to receive in a notification message in response to a change to the first data; second information identifying second data which the subscriber node (700) wishes to receive with such a notification message; and third information, different to the first information, specifying a condition to be fulfilled in relation to third data before such a notification message is sent. The first, second and third data each relate to the user and are held at the database node (900). The subscribe message is sent (S2) towards the database node (900). The subscribe message sent from the subscriber node (700) is received (S3) at the database node (900). The subscribe message received at the database node (900) comprises the first, second and third information. At the database node (900) a change to the first data identified by the received first information is detected (S4). In response to the detecting of such a change, and if it is determined (S5) that the condition specified in the received third information has been fulfilled, one or more notification messages is/are sent (S6) from the database node (900) towards the subscriber node (700). The notification message or messages comprise(s): the first data following the detected change; and the second data specified by the received second information.

46 Claims, 6 Drawing Sheets

(56) References Cited

U.S. PATENT DOCUMENTS

| | | | |
|---|---|---|---|
| 6,643,682 B1 * | 11/2003 | Todd et al. | 709/202 |
| 7,907,618 B2 | 3/2011 | Chen | |
| 2008/0256177 A1 * | 10/2008 | Boberg et al. | 709/203 |

FOREIGN PATENT DOCUMENTS

| | | |
|---|---|---|
| JP | 2007534251 A | 11/2007 |
| JP | 2009508242 A | 2/2009 |
| WO | 03083703 A1 | 10/2003 |

OTHER PUBLICATIONS

Techincal Specification Group Core Network and Terminals, 3GPP TS 29.328, V8.0.0, Sophia Antipolis Valbonne, France, Mar. 26, 2008, pp. 1-43.

3rd Generation Partnership Project. "Sh Interface Based on the Diameter Protocol; Protocol Details (Release 7)." Technical Specification Group Core Network and Terminals, 3GPP TS 29.329, V8.0.0, Sophia Antipolis Valbonne, France, Mar. 26, 2008, pp. 1-18.

* cited by examiner

METHOD AND APPARATUS FOR HANDLING SUBSCRIPTIONS TO CHANGES IN USER DATA IN A TELECOMMUNICATIONS SYSTEM

TECHNICAL FIELD

The present invention relates to method and apparatus for handling subscriptions to changes in user data in a telecommunications system, for example in an IP Multimedia Subsystem (IMS).

BACKGROUND

Figure 1:
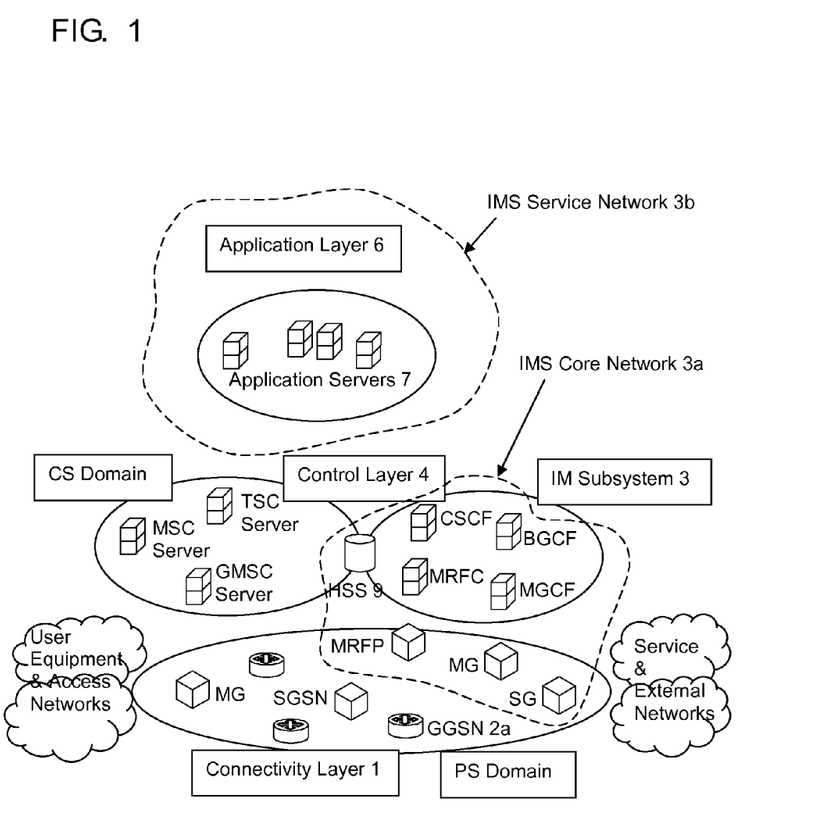
FIG. 1, discussed hereinbefore, illustrates schematically a mobile network architecture including a General Packet Radio Service access network and an IP Multimedia Subsystem.

FIG. 1 of the accompanying drawings illustrates schematically a mobile network architecture including a General Packet Radio Service (GPRS) access network and an IP Multimedia Subsystem (IMS). The IP Multimedia Subsystem (IMS) is the technology defined by the Third Generation Partnership Project (3GPP) to provide IP multimedia services over mobile communication networks. IP multimedia services can provide a dynamic combination of voice, video, messaging, data, etc. within the same session. The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

As shown in FIG. 1, managing of communications of user terminals (user equipment, UE; not shown in the figure) that connect to the network of FIG. 1 can be considered as held at three layers (or planes). The lowest layer (illustrated in FIG. 1 as "Connectivity Layer 1"), is also referred to as the bearer or user plane, and provides the connectivity means through which signals are directed to/from UEs accessing the network. The entities within the connectivity layer 1 that connect a UE to a further network providing application services (e.g. allowing an IMS subscriber to access from his UE to IMS services provided by IMS service network 3b) form a network that is referred to as an IP-Connectivity Access Network, IP-CAN. A GPRS network is an example of an IP-CAN network and, apart of the radio access nodes, includes various GPRS Support Nodes (GSNs), such as Gateway GPRS Support Nodes (GGSN) and Serving GPRS Support Nodes (SGSN). A GGSN (e.g. GGSN 2a) cooperates with one or more SGSNs, and acts as an interface between the GPRS backbone network and other networks (such as an IMS network). A middle layer (illustrated in FIG. 1 as "Control Layer 4") implements control functions relating to the signals held by the IP-CAN network. For example, in case of an IP-CAN network comprising GPRS, part of these functions can be implemented by SGSNs and GGSNs of the IP-CAN network, and relate to the processing of signals received from, or addressing to, a UE that connects through the IP-CAN network (e.g. bearer establishment, bearer termination, etc). At the top of a UE's communication there can be further servers managing high-layer aspects of the communication (illustrated in FIG. 1 by an "Application Layer 6" comprising one or more "Application Servers 7").

In the illustrated example, the IMS subsystem 3 includes a core network 3a and a service network 3b. The IMS core network 3a includes nodes that send/receive signals to/from nodes in the IP-CAN network (e.g. via the GGSN 2a). In particular, the IMS 3 comprises network nodes (known as "Call Session Control Functions, CSCFs, which operate as SIP proxies, and which are arranged to communicate with nodes of an IP-CAN network that perform connectivity and control functions (e.g. with a GGSN 2a).

The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. Application Servers (AS) 7 can be provided for implementing some of IMS service functionality. For example, an AS 7 can receive and process signaling related to a UE (i.e. as received from an IP-CAN network to which the UE attaches) so as to control higher layer aspects of a service (e.g. divert an incoming call to a voice mail service, or forward it to a certain terminal, etc).

A Home Subscriber Server (HSS) 9, or User Profile Server Function (UPSF), is a user database that supports the IMS network entities that handle calls. The HSS 9 contains subscription-related information (such as subscriber profiles), performs authentication and authorization of a subscriber, and provides information about the subscriber's location and IP information. The HSS 9 is similar to the GSM Home Location Register (HLR) and Authentication Centre (AuC).

Figure 2:
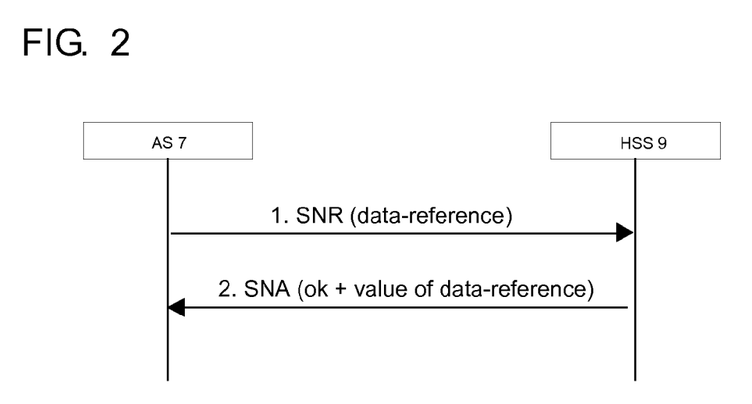
FIG. 2, also discussed hereinbefore, is a message exchange diagram illustrating schematically a previously-considered method for an AS to subscribe to data held at an HSS.

Currently the Sh interface (see 3GPP TS 29.328 and 29.329) provides mechanisms for subscriptions to notifications concerning user data changes. As illustrated in the message exchange diagram of FIG. 2 of the accompanying drawings, this mechanism allows an Application Server 7 to be notified about changes, creation or removal of specified user data in the HSS 9 using the Sh-Subs-Notif (Subscribe-Notifications-Request or SNR) command (FIG. 2; message 1). The HSS 9 may accept the subscription and possibly return the current value of the data subscribed in the Sh-Subs-Notif-Response (Subscribe-Notifications-Answer or SNA; message 2 of FIG. 2).

When the subscription is accepted, whenever the requested user data (e.g. location data) changes, the HSS 9 notifies the AS 7 about this change by sending a Sh-Notif (Push-Notification-Request or PNR) command with the new value (e.g. new S-CSCF name, new MSC/VLR number).

The present applicant has identified the following technical limitations with the currently-defined behaviour over the Sh interface, which will be explained with reference to the message exchange diagram of FIG. 3 of the accompanying drawings. The example illustrated by FIG. 3 relates to a scenario where an operator wishes to send "welcome" greetings and local information when a user powers on their equipment, based on the location of the user. In this case, the service logic needs to be notified when the status is changed to "registered", and to be able to know the type of message to be sent to the user (e.g. local tourist attractions), the location data is also needed.

When the service logic for a certain user in the AS 7 needs to be informed when certain data (data-reference) changes its value, the AS 7 sends a Sh-Subs-Notif (SNR) command for each and every data requested (e.g. registration status, location data, service data, etc.). This can be done with multiple SNR commands each with a single data-reference, or a single SNR command including multiple data-reference values. The latter approach is illustrated by messages 1 and 2 of FIG. 3 (subscribing to changes in user status and location).

Regardless of the procedure used, the HSS 9 will send a notification (PNR) to the AS 7 every time the data changes. If multiple data are requested, as in the example of FIG. 3, this will result in multiple (and separate) notifications, no matter what the new value is, no matter what the old value was and no matter what the current value of other data-reference is. This is illustrated by messages 3 to 6 of FIG. 3 (the two instances of messages 3 and 4 relate to two separate respective changes in location data for the user, while message 5 and 6 relate to a change in the status of the user).

The present applicant has come to the significant appreciation that there is presently no possibility of performing some criteria/filtering over the Sh interface. Hence, the AS 7 may receive notifications that are ignored because they are not needed by the service logic. Taking into account the amount of users and the number of data-references, the impact on the Sh signalling may be big, especially when using TCP/SCTP connections (as it happens for Diameter protocol used by Sh), which demands also CPU capacity (to control the sequence numbers, for example).

In addition, the present applicant has appreciated that the current mechanism forces the AS 7 to subscribe to several data-reference items unnecessarily; e.g. an AS 7 may need to be informed about a change in registration status, and only when this data changes does it also need the location data to execute the service logic (which does not necessarily mean that the location data changes on its own are needed). This scenario requires that the AS 7 subscribes to both data (and eventually receiving notifications that are discarded; e.g. when the location data is changed without a user status change), or that the AS 7 subscribes only to location data, and when the notification is received, the AS 7 needs to read the current value of location data using Sh-Pull (UDR). In both cases, there is a lot of extra signalling over the interface. In addition, in most cases it requires that the AS 7 cannot work in a data-less configuration, since the data needs to be stored/cached for future use. This data is then stored both in the HSS 9 and temporarily in the AS 7, which does not allow a cluster of ASs 7 to execute the service logic in a load balancing configuration.

It is desirable to address the above issue as identified and formulated by the present applicant.

SUMMARY

According to a first aspect of the present invention there is provided a method for handling subscriptions from a subscriber node to changes in data relating to a user held at a database node in a telecommunications system. At the subscriber node a subscribe message is prepared comprising: first information identifying first data which the subscriber node wishes to receive in a notification message in response to a change to the first data; second information identifying second data which the subscriber node wishes to receive with such a notification message; and third information, different to the first information, specifying a condition to be fulfilled in relation to third data before such a notification message is sent. The first, second and third data each relate to the user and are held at the database node. The subscribe message is sent towards the database node. The subscribe message sent from the subscriber node is received at the database node. The subscribe message received at the database node comprises the first, second and third information. At the database node a change to the first data identified by the received first information is detected. In response to the detecting of such a change, and if it is determined that the condition specified in the received third information has been fulfilled, one or more notification messages is/are sent from the database node towards the subscriber node. The notification message or messages comprise(s): the first data following the detected change; and the second data specified by the received second information.

According to a second aspect of the present invention there is provided a method for use by a subscriber node for handling subscriptions from the subscriber node to changes in data relating to a user held at a database node in a telecommunications system, the method comprising: preparing a subscribe message comprising: first information identifying first data which the subscriber node wishes to receive in a notification message in response to a change to the first data; second information identifying second data which the subscriber node wishes to receive with such a notification message; and third information, different to the first information, specifying a condition to be fulfilled in relation to third data before such a notification message is sent; the first, second and third data each relating to the user and being held at the database node; sending the subscribe message towards the database node; and receiving, following such a change to the first data and the condition specified in the third information having been fulfilled, one or more notification messages from the database node, the notification message or messages comprising: the first data following the change; and the second data specified by the second information.

According to a third aspect of the present invention there is provided a method for use by a database node for handling subscriptions from a subscriber node to changes in data relating to a user held at the database node in a telecommunications system, the method comprising: receiving a subscribe message sent from the subscriber node, the subscribe message comprising first information identifying first data which the subscriber node wishes to receive in a notification message in response to a change to the first data; second information identifying second data which the subscriber node wishes to receive with such a notification message; and third information, different to the first information, specifying a condition to be fulfilled in relation to third data before such a notification message is sent; the first, second and third data each relating to the user and being held at the database node; detecting a change to the first data identified by the received first information; and in response to the detecting of such a change, and if it is determined that the condition specified in the received third information has been fulfilled, sending one or more notification messages towards the subscriber node, the notification message or messages comprising: the first data following the detected change; and the second data specified by the received second information.

According to a fourth aspect of the present invention there is provided an apparatus for use as or in a subscriber node in a method for handling subscriptions from the subscriber node to changes in data relating to a user held at a database node in a telecommunications system, the apparatus comprising: a processor or other means for preparing a subscribe message comprising: first information identifying first data which the subscriber node wishes to receive in a notification message in response to a change to the first data; second information identifying second data which the subscriber node wishes to receive with such a notification message; and third information, different to the first information, specifying a condition to be fulfilled in relation to third data before such a notification message is sent; the first, second and third data each relating to the user and being held at the database node; a transmitter or other means for sending the subscribe message towards the database node; and a receiver or other means for receiving, following such a change to the first data and the condition specified in the third information having been fulfilled, one or more notification messages from the database node, the notification message or messages comprising: the first data following the change; and the second data specified by the second information.

According to a fifth aspect of the present invention there is provided an apparatus for use as or in a database node in a method for handling subscriptions from a subscriber node to changes in data relating to a user held at the database node in a telecommunications system, the apparatus comprising: a receiver or other means for receiving a subscribe message sent from the subscriber node, the subscribe message comprising first information identifying first data which the subscriber node wishes to receive in a notification message in response to a change to the first data; second information identifying second data which the subscriber node wishes to receive with such a notification message; and third information, different to the first information, specifying a condition to be fulfilled in relation to third data before such a notification message is sent; the first, second and third data each relating to the user and being held at the database node; a processor or other means for detecting a change to the first data identified by the received first information; and a transmitter or other means for, in response to the detecting of such a change, and if it is determined that the condition specified in the received third information has been fulfilled, sending one or more notification messages towards the subscriber node, the notification message or messages comprising: the first data following the detected change; and the second data specified by the received second information.

The subscribe message may comprise fourth information specifying whether the subscriber node wishes to receive with such a notification message a version of the first data prior to the change.

Where such fourth information is included, the one or more notification messages sent towards the subscriber node further may comprise a version of the first data prior to the detected change.

The third information may specify a range of values or content for an item of the third data. For example, wildcarded contents could be allowed, or an explicit range of values could be specified for a particular data item held at the database node.

The third information may specify a logical condition relating to a plurality of items of the third data. For example, the logical condition could comprise one or more of the Boolean logical expressions AND, OR, XOR, and so on. For instance, the condition could specify that the first data is sent only if data value A is X and data value B is Y, or if data value C is Z.

The third data may comprise the first data and/or the second data. In other words, a condition could be placed on the content or value of the second data, so that the first and second data are only sent in response to a change in the first data if the second data has a certain value or comprises certain content. The value or content of the first data could also be taken into account, or taken into account regardless of the value or content of the second data. The sending of the first and second data could be made conditional on the value or content of any user data held at the database node.

The first and second data may be sent in a single notification message.

The database node may comprise a User Data Repository, UDR, of the telecommunications system configured to hold data relating to a plurality of users of the system. The subscriber node may comprise a server function configured to use data held by the UDR to provide a service to a user of the system.

The telecommunications system may comprise an IP Multimedia Subsystem, IMS.

The subscriber node may comprise an Application Server, AS.

The database node may comprise a Home Subscriber Server, HSS.

The subscribe and notification messages may be sent over a "Sh" interface between the subscriber node and the database node.

The subscribe message may be a DIAMETER protocol command Subscribe-Notifications-Request, SNR.

The notification message may be a DIAMETER protocol command Push-Notification-Request, PNR.

According to a sixth aspect of the present invention there is provided a program for controlling an apparatus to perform a method according to the first, second or third aspect of the present invention or which, when loaded into an apparatus, causes the apparatus to become an apparatus according to the fourth or fifth aspect of the present invention. The program may be carried on a carrier medium. The carrier medium may be a storage medium. The carrier medium may be a transmission medium.

According to a seventh aspect of the present invention there is provided an apparatus programmed by a program according to the sixth aspect of the present invention.

According to an eighth aspect of the present invention there is provided a storage medium containing a program according to the sixth aspect of the present invention.

An embodiment of the present invention offers a technical advantage of addressing the issue mentioned above relating to the prior art. Technical advantages are set out in more detail below.

DETAILED DESCRIPTION

Figure 3:
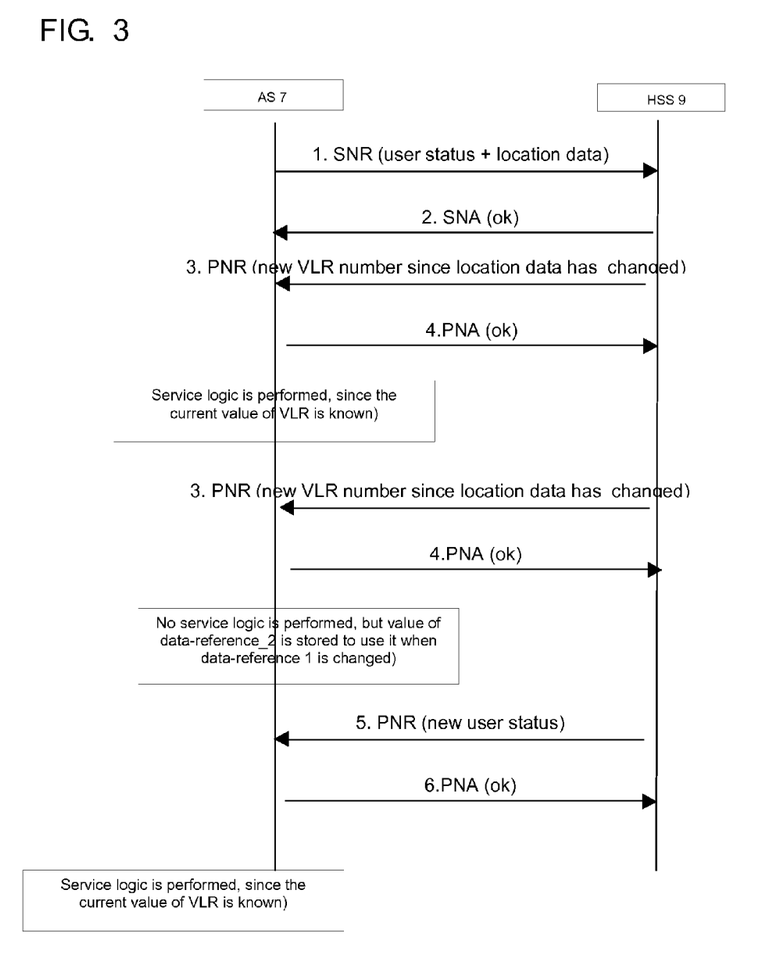
FIG. 3, also discussed hereinbefore, is a message exchange diagram illustrating schematically a previously-considered method for an AS to subscribe to multiple data held at an HSS.
Figure 5:
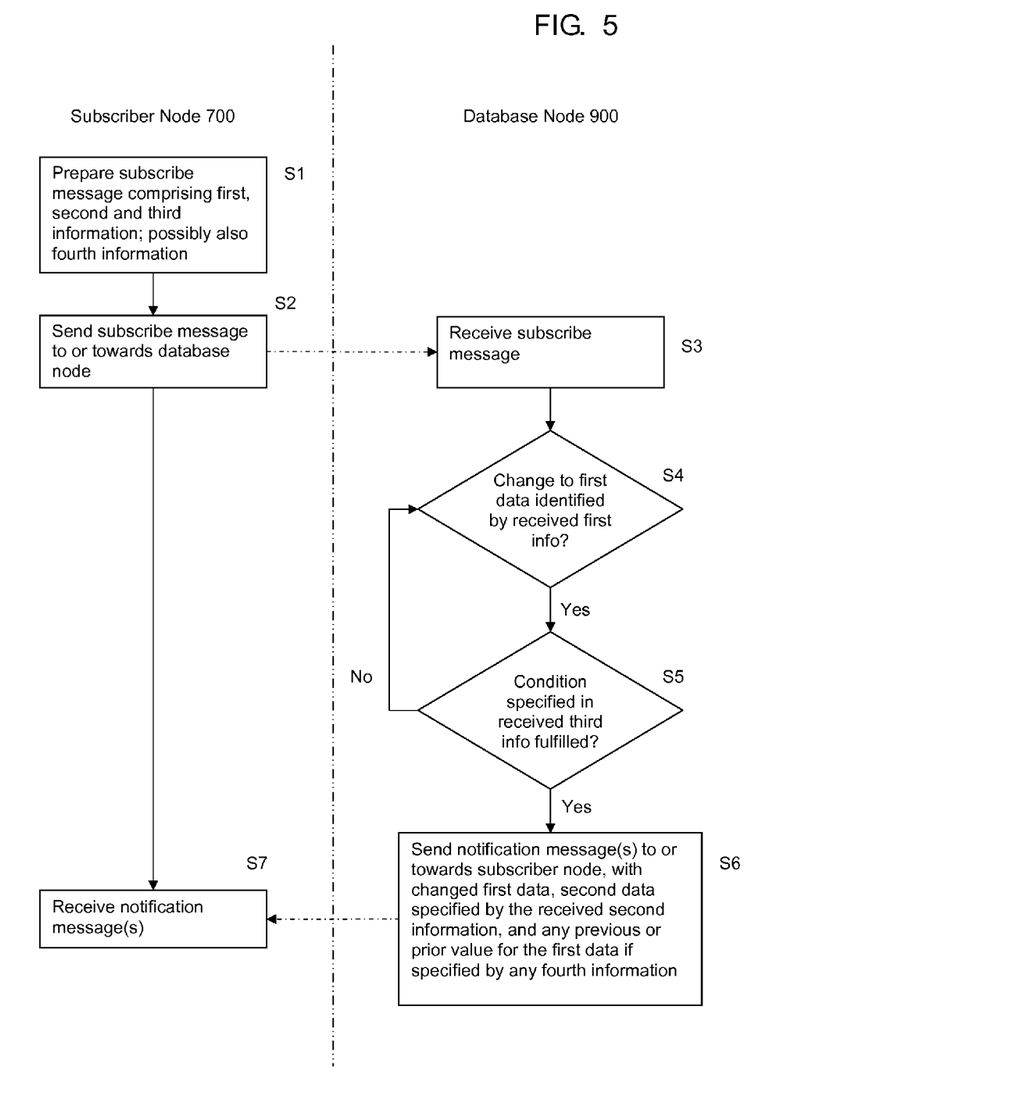
FIG. 5 is a flowchart illustrating schematically and in more general terms a method performed according to an embodiment of the present invention.
Figure 6:
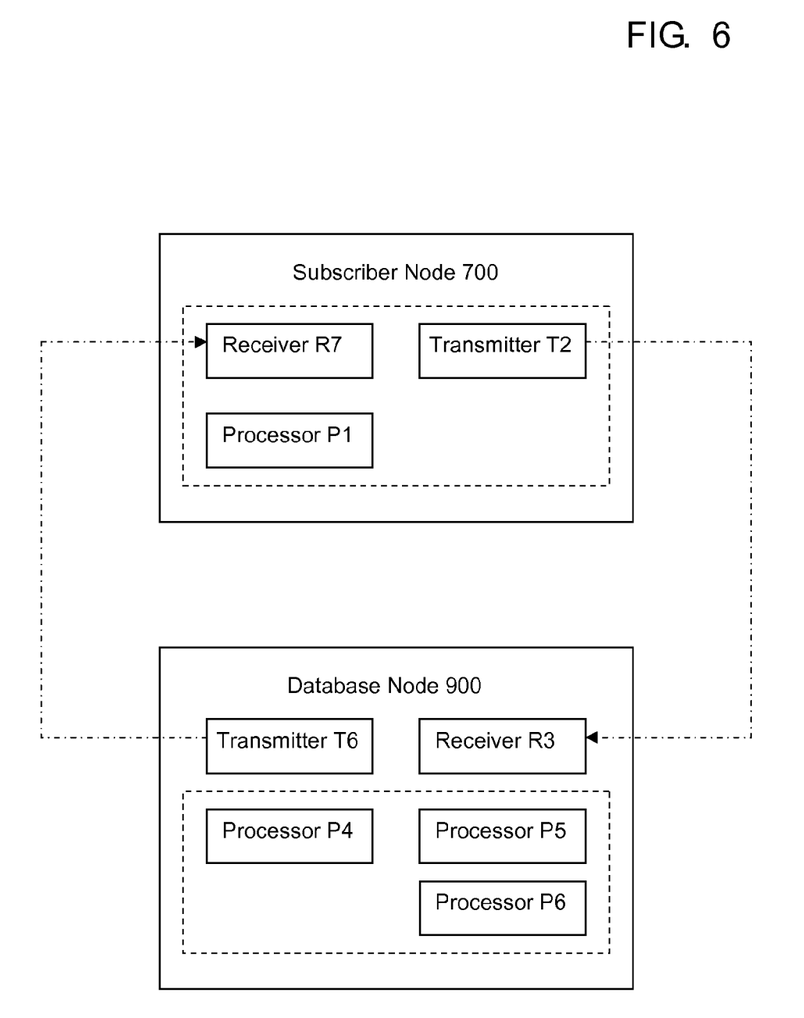
FIG. 6 is a schematic block diagram illustrating apparatus according to an embodiment of the present invention.

Before a description of an apparatus and method embodying the present invention with reference to FIGS. 5 and 6, an overview will first be provided with reference to FIG. 3.

The invention provides mechanisms to save signalling over the interface, make easier the logic in the AS to execute services and also to avoid the requirement of the AS to locally store the information provided by the HSS. This can be achieved with two enhancements in Sh:

1) Allow the interface to specify conditions/criteria. An AS will be able to request for notifications when certain data or conditions change, provided that additional conditions are fulfilled too.

2) Allow the interface to request additional data when a notification is to be sent by HSS. An AS will be able to indicate what other data contents are required when subscribed data changes.

Currently, the Sh-Subs-Notif request (SNR) requires basically the user identity and the data-reference (see table 6.1.3.1 in 3GPP TS 29.328). When the data changes to a new value, the notification sent by HSS towards the requesting AS will contain the new value of the data that has been changed.

The present invention enhances this mechanism by extending the protocol and including additional information elements (IEs):
1) Additional data to be sent
2) If old value is required together with the new value
3) Conditions to be fulfilled This could be achieved by allocating new diameter AVPs:
1) Additional-data-reference AVP. This AVP would contain multiple data-reference that are required to be sent in the notification (see 3GPP TS 29.329, section 6.3.4), together with the new value of the data-reference subscribed to.
2) Old-value-requested AVP. This AVP would be of type Boolean. When value is set to TRUE, the old value would be sent together with the new value
3) Notif-Conditions AVP. This would be a grouped AVP composed by several AVPs:
   Data-reference-condition AVP. Data-reference which has to be evaluated.
   Data-reference-value AVP. Content of the data that has to be evaluated
   Condition AVP. If multiple conditions must be fulfilled simultaneously (AND), or any condition fulfilled will trigger a notification (OR)

Considering again the example given above, where an AS wants to send a message/greeting to a user that becomes "registered" (regardless if the user was "unregistered" or "not_registered"), the SNR request over Sh would contain:
1) Data-reference AVP. The value would be set to UserState (value 15, see 6.3.4 in 3GPP TS 29.329)
2) Additional-data-reference AVP. This AVP would include two instances:
   S-CSCFName (value 12)
   LocationInformation (value 14)
3) Old-value-requested AVP. The absence of this AVP, or the AVP with value set to FALSE, would indicate that the service logic in the AS does not require the old value.
4) Notif-Conditions AVP. If the AS is only required to send a welcome message (and tourist information) for certain locations (e.g. Portugal and France), multiple instances of this AVP would be populated as follows:
   Data-reference-condition AVP. The value would be LocationInformation (14)
   Data-reference-value AVP. The value would be (351*). Wildcarded contents could be allowed. This implies that any VLR address beginning with 351 (Portugal Country Code) will meet the condition
   Condition AVP. The value would be "OR", since France is another condition, but both are not required to be fulfilled simultaneously For France, the same conditions apply. So another Notif-Conditions AVP would be needed, simply changing the Data-reference-value AVP (with CC of France="33*")

Figure 4:
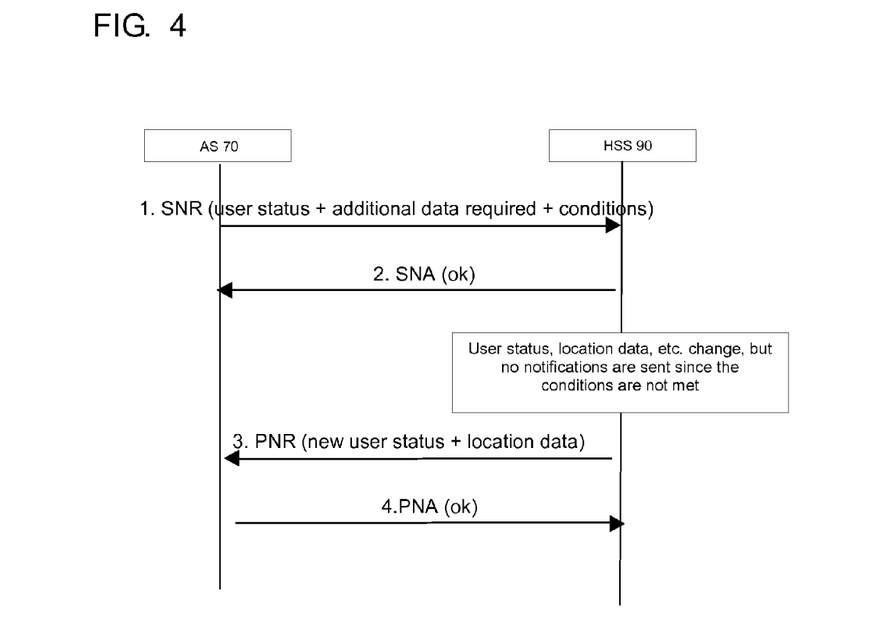
FIG. 4 is a message exchange diagram illustrating schematically a scheme according to an embodiment of the present invention.

FIG. 4 shows the interface perspective (message exchanged between an AS 70 and an HSS 90 according to an embodiment of the present invention), the differences in signalling and also the requirements on the AS 70 (i.e. the AS 70 can work in a dataless/stateless configuration, since there is not a need to store information locally).

FIG. 5 is a flowchart illustrating schematically a method performed by a subscriber node 700 and a database node 900 according to an embodiment of the present invention, while FIG. 6 is a schematic block diagram illustrating parts of the subscriber node 700 and database node 900.

The subscriber node 700 corresponds generally to the Application Server 70 of FIG. 4, while the database node 900 corresponds generally to the HSS 90 of FIG. 4. However, the subscriber node 700 and the database node 900 are not intended to be limited respectively to an AS and HSS.

The flowchart depicted in FIG. 5 can be considered as methods for use respectively by the subscriber node 700 and the database node 900 for handling subscriptions from the subscriber node 700 to changes in data relating to a user held at the database node 900 in a telecommunications system.

The subscriber node 700 comprises a processor P1, a transmitter T2 and a receiver R7. The database node 900 comprises a receiver R3, a processor P4, a processor P5, a processor P6 and a transmitter T6. The numerical part of these references is intended to correspond generally with the numerical parts of the reference numerals associated with the steps shown in FIG. 5; for example, the processor P4 of FIG. 6 is generally responsible for performing step S4 of FIG. 5, while the transmitter T2 of FIG. 6 is generally responsible for performing step S2 of FIG. 5.

In step S1, the processor P1 of the subscriber node 700 prepares a subscribe message comprising: first information identifying first data which the subscriber node 700 wishes to receive in a notification message in response to a change to the first data; second information identifying second data which the subscriber node 700 wishes to receive with such a notification message; and third information, different to the first information, specifying a condition to be fulfilled in relation to third data before such a notification message is sent. The first, second and third data each relate to the user concerned, and are held at the database node 900. The subscribe message may also comprise fourth information specifying whether the subscriber node 700 wishes to receive with such a notification message a version of the first data prior to the change.

The third information is different to the first information for example in the sense that it does not merely specify a condition that is simply a repeat of a condition which is at least implicitly specified by the first information. The at least implicit condition specified by the first information is that a change to the first data is required before such a notification message is sent.

It will be apparent that the first, second, third and fourth information correspond respectively to the following AVPs mentioned above: Data-reference AVP; Additional-data-reference AVP; Notif-Conditions AVP; and Old-value-requested AVP. However, the form of the first, second, third and fourth information is not intended to be limited to these AVPs. The subscribe message corresponds generally to the SNR message mentioned above, though again, it is possible to implement a subscribe message in another form.

In step S2, the transmitter T2 of the subscriber node 700 sends the subscribe message towards the database node 900; the subscribe message may not reach database 900 directly, but may pass through one or more other nodes of the telecommunications system.

In step S3, the receiver R3 of the database node 900 receives the subscribe message sent from the subscriber node 700. The subscribe message comprises: the first information identifying first data which the subscriber node 700 wishes to receive in a notification message in response to a change to the first data; the second information identifying second data which the subscriber node 700 wishes to receive with such a notification message; and the third information, different to the first information, specifying a condition to be fulfilled in relation to third data before such a notification message is sent. The first, second and third data each relate to the user concerned, and are held at the database node 900. The subscribe message may also comprise the fourth information (if included in the subscribe message by the subscriber node 700 in step S1) specifying whether the subscriber node 700 wishes to receive with such a notification message a version of the first data prior to the change.

In step S4, the processor P4 of the database node 900 monitors for any changes to the first data identified by the received first information. If a change to the first data identified by the received first information is detected, and in response to the detecting of such a change, processing passes to step S5; otherwise, processing remains at step S4.

In step S5, the processor P5 of the database node 900 determines whether the condition specified in the received third information has been fulfilled. If it is determined that the condition specified in the received third information has been fulfilled, the processing passes to step S6; otherwise, processing returns to step S4. It is to be noted that the actual processing required to make the determination of step S5 could be carried out before step S4.

In step S6, the processor P6 of the database node 900 generates one or more notification messages and the transmitter T6 of the database node 900 sends the one or more notification messages towards the subscriber node 700. The notification message or messages comprise(s): the first data following the detected change; and the second data specified by the received second information. If subscribe message received in step S3 comprised the fourth information, then the one or more notification messages would further comprise a version of the first data prior to the detected change.

In step S7, the receiver R7 of the subscriber node 700 receives, following such a change to the first data and the condition specified in the third information having been fulfilled, the one or more notification messages sent from the database node 900. The received notification message or messages comprise(s): the first data following the change; the second data specified by the second information; and possibly a version of the first data prior to the change.

Preferably a single notification message is used to carry all of the data being notified to the subscriber node 700 in response to a single change in the first data at the database node 900 (i.e. the first data following the change; the second data specified by the second information; and possibly a version of the first data prior to the change).

The notification message or messages correspond generally to the PNR messages mentioned above, though any type of notification message would be suitable.

This invention offers at least one of the following advantages:

Offers the possibility of dynamically change the conditions for a subscriptions. A user may change his own service data, activate/deactivate service, etc. The AS handling the service logic controls why a notification is required, and what is the information required in the notification.

Decreases considerably the signalling over the interface, since undesirable notifications are avoided.

Allows a (web) server farm of ASs, that is, a cluster of ASs working as a single entity, with the load distributed, and without the need of locally store/synchronize data among them.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components (e.g. as illustrated by the dotted outlines in FIG. 6). Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims.

In particular, it will be appreciated that the term Home Subscriber Server used herein is intended to cover nodes having an equivalent function of holding user-related data, such as a Home Location Register (HLR), and the term "database node" may be used instead. Likewise, the term Application Server used herein is intended to cover any type of node which may wish to subscribe to changes in data relating to a user held at a database node, whether or not that node has a server function; the term "subscriber node" may be used instead. The database node may comprise a User Data Repository (UDR) configured to hold data relating to a plurality of users of the system, and the subscriber node may comprise a server function configured to use data held by the UDR to provide a service to a user of the system. It will therefore be readily apparent that the present invention is not limited to an IMS context, nor to notifications filtering over the Sh interface, but is applicable more generally for handling subscriptions from a subscriber node to changes in data relating to a user held at a database node in any telecommunications system over any interface.

The invention claimed is:

1. A method for handling subscriptions from a subscriber node to changes in data relating to a user held at a database node in a telecommunications system, the method comprising:

at the subscriber node:
preparing a subscribe message comprising: first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node; and sending the subscribe message towards the database node;

at the database node:
receiving the subscribe message sent from the subscriber node, the subscribe message comprising the first, second, and third information;

detecting a change to the first data identified by the received first information;

in response to the detecting the change, and if it is determined that the condition specified in the received third information has been fulfilled, sending one or more notification messages towards the subscriber node, the one or more sent notification messages comprising: the first data following the detected change; the second data specified by the received second information; and a version of the first data prior to the detected change.

2. The method as claimed in claim 1, wherein the third information specifies a range of values or content for an item of the third data.

3. The method as claimed in claim 1, wherein the third information specifies a logical condition relating to a plurality of items of the third data.

4. The method as claimed in claim 1, wherein the third data comprises at least one of the first data and the second data.

5. The method as claimed in claim 1, wherein sending the one or more notification messages comprises sending the first data, the second data, and the version of the first data prior to the detected change in a single notification message.

6. The method as claimed in claim 1, wherein the database node comprises a User Data Repository (UDR) of the telecommunications system configured to hold data relating to a plurality of users of the system; and wherein the subscriber node comprises a server function configured to use data held by the UDR to provide a service to a user of the system.

7. The method as claimed in claim 1, wherein the telecommunications system comprises an Internet Protocol (IP) Multimedia Subsystem (IMS); wherein the subscriber node comprises an Application Server (AS); and wherein the database node comprises a Home Subscriber Server (HSS).

8. The method as claimed in claim 7, wherein sending the subscribe message and the one or more notification messages comprises sending the subscribe message and the one or more notification messages over an "Sh" interface between the subscriber node and the database node.

9. The method as claimed in claim 8, wherein the subscribe message comprises a DIAMETER protocol command Subscribe-Notifications-Request (SNR); and wherein the notification message comprises a DIAMETER protocol command Push-Notification-Request (PNR).

10. A method for use by a subscriber node for handling subscriptions from the subscriber node to changes in data relating to a user held at a database node in a telecommunications system, the method comprising:

preparing a subscribe message comprising: first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node;

sending the subscribe message towards the database node; and receiving, following such a change to the first data and the condition specified in the third information having been fulfilled, one or more notification messages from the database node, the one or more received notification messages comprising: the first data following the change; the second data specified by the second information; and a version of the first data prior to the detected change.

11. The method as claimed in claim 10, wherein the third information specifies a range of values or content for an item of the third data.

12. The method as claimed in claim 10, wherein the third information specifies a logical condition relating to a plurality of items of the third data.

13. The method as claimed in claim 10, wherein the third data comprises at least one of the first data and the second data.

14. The method as claimed in claim 10, wherein the database node comprises a User Data Repository (UDR) of the telecommunications system configured to hold data relating to a plurality of users of the system; and wherein the subscriber node comprises a server function configured to use data held by the UDR to provide a service to a user of the system.

15. The method as claimed in claim 10, wherein the telecommunications system comprises an Internet Protocol (IP) Multimedia Subsystem (IMS); wherein the subscriber node comprises an Application Server (AS); and wherein the database node comprises a Home Subscriber Server (HSS).

16. The method as claimed in claim 15, wherein sending the subscribe message, and receiving the one or more notification messages, comprises exchanging the subscribe message and the one or more notification messages over an "Sh" interface between the subscriber node and the database node.

17. The method as claimed in claim 6, wherein the subscribe message comprises a DIAMETER protocol command Subscribe-Notifications-Request (SNR); and wherein the notification message comprises a DIAMETER protocol command Push-Notification-Request (PNR).

18. A method for use by a database node for handling subscriptions from a subscriber node to changes in data relating to a user held at the database node in a telecommunications system, the method comprising:

receiving a subscribe message sent from the subscriber node, the subscribe message comprising first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node;

detecting a change to the first data identified by the received first information; and in response to the detecting of such a change, and if it is determined that the condition specified in the received third information has been fulfilled:

sending one or more notification messages towards the subscriber node, the one or more sent notification messages comprising: the first data following the detected change; the second data specified by the received second information; and a version of the first data prior to the detected change.

19. The method as claimed in claim 18, wherein the third information specifies a range of values or content for an item of the third data.

20. The method as claimed in claim 18, wherein the third information specifies a logical condition relating to a plurality of items of the third data.

21. The method as claimed in claim 18, wherein the third data comprises at least one of the first data and the second data.

22. The method as claimed in claim 18, wherein sending the one or more notification messages comprises sending the first data, the second data; and the version of the first data prior to the detected change in a single notification message.

23. The method as claimed in claim 18, wherein the database node comprises a User Data Repository (UDR) of the telecommunications system configured to hold data relating to a plurality of users of the system; and wherein the subscriber node comprises a server function configured to use data held by the UDR to provide a service to a user of the system.

24. The method as claimed in claim 18, wherein the telecommunications system comprises an Internet Protocol (IP) Multimedia Subsystem (IMS); wherein the subscriber node comprises an Application Server (AS); and wherein the database node comprises a Home Subscriber Server (HSS).

25. The method as claimed in claim 24, wherein receiving the subscribe message, and sending the one or more notification messages, comprises exchanging the subscribe message and the one or more notification messages over an "Sh" interface between the subscriber node and the database node.

26. The method as claimed in claim 24, wherein the subscribe message comprises a DIAMETER protocol command Subscribe-Notifications-Request (SNR); and wherein the notification message comprises a DIAMETER protocol command Push-Notification-Request (PNR).

27. An apparatus for handling subscriptions from the subscriber node to changes in data relating to a user held at a database node in a telecommunications system, the apparatus comprising:
a processor configured to prepare a subscribe message comprising: first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node;
a storage configured to store data processed by the processor;
a transmitter configured to send the subscribe message towards the database node; and
a receiver configured to receive, following such a change to the first data and the condition specified in the third information having been fulfilled, one or more notification messages from the database node, the one or more received notification messages comprising: the first data following the change; the second data specified by the second information; and a version of the first data prior to the detected change.

28. The apparatus as claimed in claim 27, wherein the third information specifies a range of values or content for an item of the third data.

29. The apparatus as claimed in claim 27, wherein the third information specifies a logical condition relating to a plurality of items of the third data.

30. The apparatus as claimed in claim 27, wherein the third data comprises at least one of the first data and the second data.

31. The apparatus as claimed in claim 27, wherein the database node comprises a User Data Repository (UDR) of the telecommunications system configured to hold data relating to a plurality of users of the system; and wherein the subscriber node comprises a server function configured to use data held by the UDR to provide a service to a user of the system.

32. The apparatus as claimed in claim 27, wherein the telecommunications system comprises an Internet Protocol (IP) Multimedia Subsystem (IMS); wherein the subscriber node comprises an Application Server (AS); and wherein the database node comprises a Home Subscriber Server (HSS).

33. The apparatus as claimed in claim 32, wherein the transmitter is configured to send the subscribe message, and the receiver is configured to receive the one or more notification messages, over an "Sh" interface between the subscriber node and the database node.

34. The apparatus as claimed in claim 33, wherein the subscribe message comprises a DIAMETER protocol command Subscribe-Notifications-Request (SNR); and wherein the notification message comprises a DIAMETER protocol command Push-Notification-Request (PNR).

35. An apparatus for handling subscriptions from a subscriber node to changes in data relating to a user held at the database node in a telecommunications system, the apparatus comprising:
a receiver configured to receive a subscribe message sent from the subscriber node, the subscribe message comprising first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node;
a processor configured to detect a change to the first data identified by the received first information;
a storage configured to store data processed by the processor; and
a transmitter configured to, in response to the detecting of such a change, and if it is determined that the condition specified in the received third information has been fulfilled, sending one or more notification messages towards the subscriber node, the one or more sent notification messages comprising: the first data following the detected change; the second data specified by the received second information; and a version of the first data prior to the detected change.

36. The apparatus as claimed in claim 35, wherein the third information specifies a range of values or content for an item of the third data.

37. The apparatus as claimed in claim 35, wherein the third information specifies a logical condition relating to a plurality of items of the third data.

38. The apparatus as claimed in claim 35, wherein the third data comprises at least one of the first data and the second data.

39. The apparatus as claimed in claim 35, wherein the first data, the second data, and the version of the first data prior to the detected change are sent in a single notification message.

40. The apparatus as claimed in claim 35, wherein the database node comprises a User Data Repository (UDR) of the telecommunications system configured to hold data relating to a plurality of users of the system; and wherein the subscriber node comprises a server function configured to use data held by the UDR to provide a service to a user of the system.

41. The apparatus as claimed in claim 35, wherein the telecommunications system comprises an Internet Protocol (IP) Multimedia Subsystem (IMS); wherein the subscriber node comprises an Application Server (AS); and wherein the database node comprises a Home Subscriber Server (HSS).

42. The apparatus as claimed in claim 41, wherein the receiver is configured to receive the subscribe message, and the transmitter is configured to send the one or more notification messages, over an "Sh" interface between the subscriber node and the database node.

43. The apparatus as claimed in claim 42, wherein the subscribe message comprises a DIAMETER protocol command Subscribe-Notifications-Request (SNR); and wherein the notification message comprises a DIAMETER protocol command Push-Notification-Request (PNR).

44. A non-transitory storage medium storing a program for handling subscriptions from a subscriber node to changes in data relating to a user held at a database node in a telecommunications system, the program, when executed by a programmable computer, causing the programmable computer to:

at the subscriber node:
    prepare a subscribe message comprising: first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node; and
    send the subscribe message towards the database node;
and at the database node:
    receive the subscribe message sent from the subscriber node, the subscribe message comprising the first, second, and third information;
    detect a change to the first data identified by the received first information;
    in response to the detecting the change, and if it is determined that the condition specified in the received third information has been fulfilled, send one or more notification messages towards the subscriber node, the one or more sent notification messages comprising: the first data following the detected change; the second data specified by the received second information; and a version of the first data prior to the detected change.

45. A non-transitory storage medium storing a program for handling subscriptions from a subscriber node to changes in data relating to a user held at a database node in a telecommunications system, the program, when executed by a programmable computer, causing the programmable computer to:

prepare a subscribe message comprising: first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node;

send the subscribe message towards the database node; and receive, following such a change to the first data and the condition specified in the third information having been fulfilled, one or more notification messages from the database node, the one or more received notification messages comprising: the first data following the change; the second data specified by the second information; and a version of the first data prior to the detected change.

46. A non-transitory storage medium storing a program for handling subscriptions from a subscriber node to changes in data relating to a user held at the database node in a telecommunications system, the program, when executed by a programmable computer, causing the programmable computer to:

receive a subscribe message sent from the subscriber node, the subscribe message comprising first information identifying first data which the subscriber node wishes to receive in a notification message in response to a change to the first data; second information identifying second data which the subscriber node wishes to receive with the notification message; third information, different from the first information, specifying a condition to be fulfilled in relation to third data before the notification message is sent; and fourth information specifying whether the subscriber node wishes to receive with the notification message a version of the first data prior to the change; the first, second, and third data each relating to the user and being held at the database node;

detect a change to the first data identified by the received first information; and in response to the detecting of such a change, and if it is determined that the condition specified in the received third information has been fulfilled, send one or more notification messages towards the subscriber node, the one or more sent notification messages comprising: the first data following the detected change; the second data specified by the received second information; and a version of the first data prior to the detected change.

* * * * *

UNITED STATES PATENT AND TRADEMARK OFFICE
CERTIFICATE OF CORRECTION

Page 1 of 1

PATENT NO. : 8,516,066 B2
APPLICATION NO. : 13/386064
DATED : August 20, 2013
INVENTOR(S) : Esteban Vares et al.

It is certified that error appears in the above-identified patent and that said Letters Patent is hereby corrected as shown below:

In the Specification

In Column 7, Line 32, delete "(OR)" and insert -- (OR). --, therefor.

Signed and Sealed this
Fourth Day of November, 2014

Michelle K. Lee
*Deputy Director of the United States Patent and Trademark Office*